US009239721B2

(12) United States Patent
Bonanno et al.

(10) Patent No.: US 9,239,721 B2
(45) Date of Patent: *Jan. 19, 2016

(54) GLOBAL WEAK PATTERN HISTORY TABLE FILTERING

(71) Applicant: International Business Machines Corporation, Armonk, NY (US)

(72) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/088,600

(22) Filed: Nov. 25, 2013

(65) Prior Publication Data

US 2014/0082339 A1 Mar. 20, 2014

Related U.S. Application Data

(63) Continuation of application No. 13/492,946, filed on Jun. 11, 2012.

(51) Int. Cl.
*G06F 9/30* (2006.01)
*G06F 9/38* (2006.01)

(52) U.S. Cl.
CPC .......... *G06F 9/3806* (2013.01); *G06F 9/3848* (2013.01)

(58) Field of Classification Search
CPC .............................. G06F 9/3806; G06F 9/3848
USPC .................................................. 712/240, 239
See application file for complete search history.

(56) References Cited

U.S. PATENT DOCUMENTS

| 5,574,871 | A |   | 11/1996 | Hoyt et al. |            |
|-----------|---|---|---------|-------------|------------|
| 5,758,142 | A | * | 5/1998  | McFarling et al. | 712/239 |
| 5,935,241 | A | * | 8/1999  | Shiell et al. | 712/240 |
| 6,092,187 | A | * | 7/2000  | Killian     | 712/239    |
| 6,823,446 | B1 | * | 11/2004 | Sinharoy    | 712/239    |

(Continued)

OTHER PUBLICATIONS

Seznec, et al., A case for (partially) TAgged GEometric history length branch prediction, Journal of Instruction Level Parallelism (http://www.jilp.org/vol.7) Apr. 2006, 23 pages.

(Continued)

*Primary Examiner* — Andrew Caldwell
*Assistant Examiner* — Yuqing Xiao
(74) *Attorney, Agent, or Firm* — Cantor Colburn LLP; Margaret McNamara

(57) ABSTRACT

Embodiments relate to global weak pattern history table (PHT) filtering. An aspect includes receiving a search address associated with a branch prediction, and receiving a prediction strength indicator and a tag from a PHT. Based on determining that the tag matches the search address and the prediction strength indicator is weak, an accuracy counter is compared to a comparison threshold to determine whether a PHT direction prediction from the PHT is more likely accurate than a branch history table (BHT) direction prediction from a BHT. The PHT direction prediction is selected as a direction prediction based on determining that the accuracy counter indicates that the PHT direction prediction is more likely accurate than the BHT direction prediction. The BHT direction prediction is selected as the direction prediction based on determining that the accuracy counter indicates that the BHT direction prediction is more likely accurate than the PHT direction prediction.

5 Claims, 8 Drawing Sheets

(56) References Cited

U.S. PATENT DOCUMENTS

| | | | |
|---|---|---|---|
| 6,938,151 B2* | 8/2005 | Bonanno et al. | 712/239 |
| 6,976,157 B1* | 12/2005 | Sinharoy | 712/239 |
| 7,055,023 B2* | 5/2006 | Tago et al. | 712/240 |
| 7,082,520 B2 | 7/2006 | Bonanno et al. | |
| 7,243,219 B2* | 7/2007 | Jourdan et al. | 712/239 |
| 7,523,298 B2* | 4/2009 | Gschwind | 712/239 |
| 7,673,124 B2 | 3/2010 | Kwak | |
| 7,747,845 B2 | 6/2010 | Prasky et al. | |
| 7,805,595 B2* | 9/2010 | Ozer et al. | 712/240 |
| 7,831,817 B2 | 11/2010 | Biles | |
| 7,849,299 B2 | 12/2010 | Potter et al. | |
| 7,984,279 B2 | 7/2011 | Stempel et al. | |
| 8,078,852 B2 | 12/2011 | Al-Otoom et al. | |
| 2001/0056531 A1* | 12/2001 | McFarling | 712/239 |
| 2005/0216714 A1 | 9/2005 | Grochowski | |
| 2007/0050776 A1* | 3/2007 | Ferren et al. | 718/104 |
| 2009/0210686 A1 | 8/2009 | Bonanno et al. | |
| 2012/0166775 A1* | 6/2012 | Krishnamurthy et al. | 712/239 |

OTHER PUBLICATIONS

Lee, et al., Branch Prediction Strategies and Branch Target Buffer Design, Computer, Jan. 1984, 17 pages.

McFarling, et al., Combining branch predictors, Technical Report TN-36, Digital Western Research Laboratory, Jun. 1993, 29 pages.

IBM (Jan. 19, 2010), Method to Exclude Bad Patterns from a Pattern History Table Branch Predictor, IP.com No. IPCOM000019168D, 5 pages.

* cited by examiner

GLOBAL WEAK PATTERN HISTORY TABLE FILTERING

CROSS-REFERENCE TO RELATED APPLICATION

This is a continuation application that claims the benefit of U.S. patent application Ser. No. 13/492,946 filed Jun. 11, 2012, the contents of which are incorporated by reference herein in their entirety.

BACKGROUND

The present invention relates generally to computer processing systems, and more specifically, to pattern history table filtering.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Exemplary embodiments include a system for global weak pattern history table filtering. The system includes a pattern history table, a branch history table, an accuracy counter, and a processing circuit configured to perform a method. The method includes receiving a search address associated with a branch prediction, and receiving a prediction strength indicator and a tag from the pattern history table. The method further includes determining that a pattern history table match exists based on the tag matching the search address. Based on determining that the pattern history table match exists and the prediction strength indicator is weak, an accuracy counter is compared to a comparison threshold to determine whether a pattern history table direction prediction from the pattern history table is more likely accurate than a branch history table direction prediction from the branch history table. The pattern history table direction prediction is selected as a direction prediction based on determining that the accuracy counter indicates that the pattern history table direction prediction is more likely accurate than the branch history table direction prediction. The branch history table direction prediction is selected as the direction prediction based on determining that the accuracy counter indicates that the branch history table direction prediction is more likely accurate than the pattern history table direction prediction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments provide global weak pattern history table filtering. In a processing system, a branch predictor can include a number of branch prediction structures such as a branch history table (BHT) and a pattern history table (PHT) used to predict a branch direction. A predicted branch direction can be used in combination with a branch target buffer (BTB) and/or other branch target computation logic to enhance branch prediction accuracy for a target address of a branch instruction. Accurate predictions allow processing to continue down a predicted branch path rather than waiting for the outcome of a branch to be determined. Using pairs of predictors from the PHT and BHT can further improve branch prediction accuracy.

Figure 1:
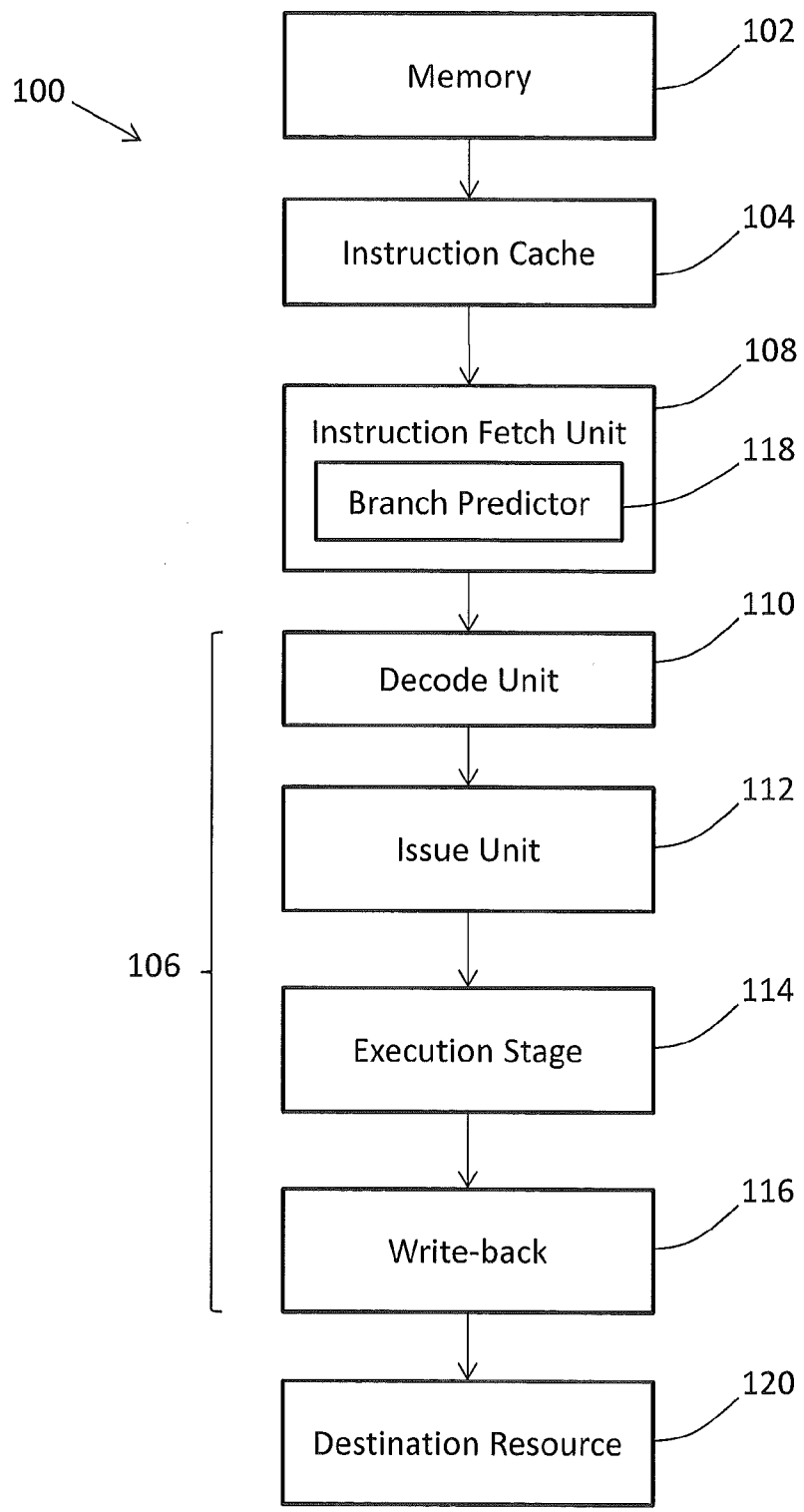
FIG. 1 depicts a processing system according to an embodiment.

FIG. 1 depicts a block diagram a processing system 100 according to an embodiment. The processing system 100 includes a memory 102, an instruction cache 104, an instruction fetch unit 108, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes a branch predictor 118. Alternatively, the branch predictor 118 may be located separately from the instruction fetch unit 108. The branch predictor 118 is an example of a processing circuit to implement global weak pattern history table filtering.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
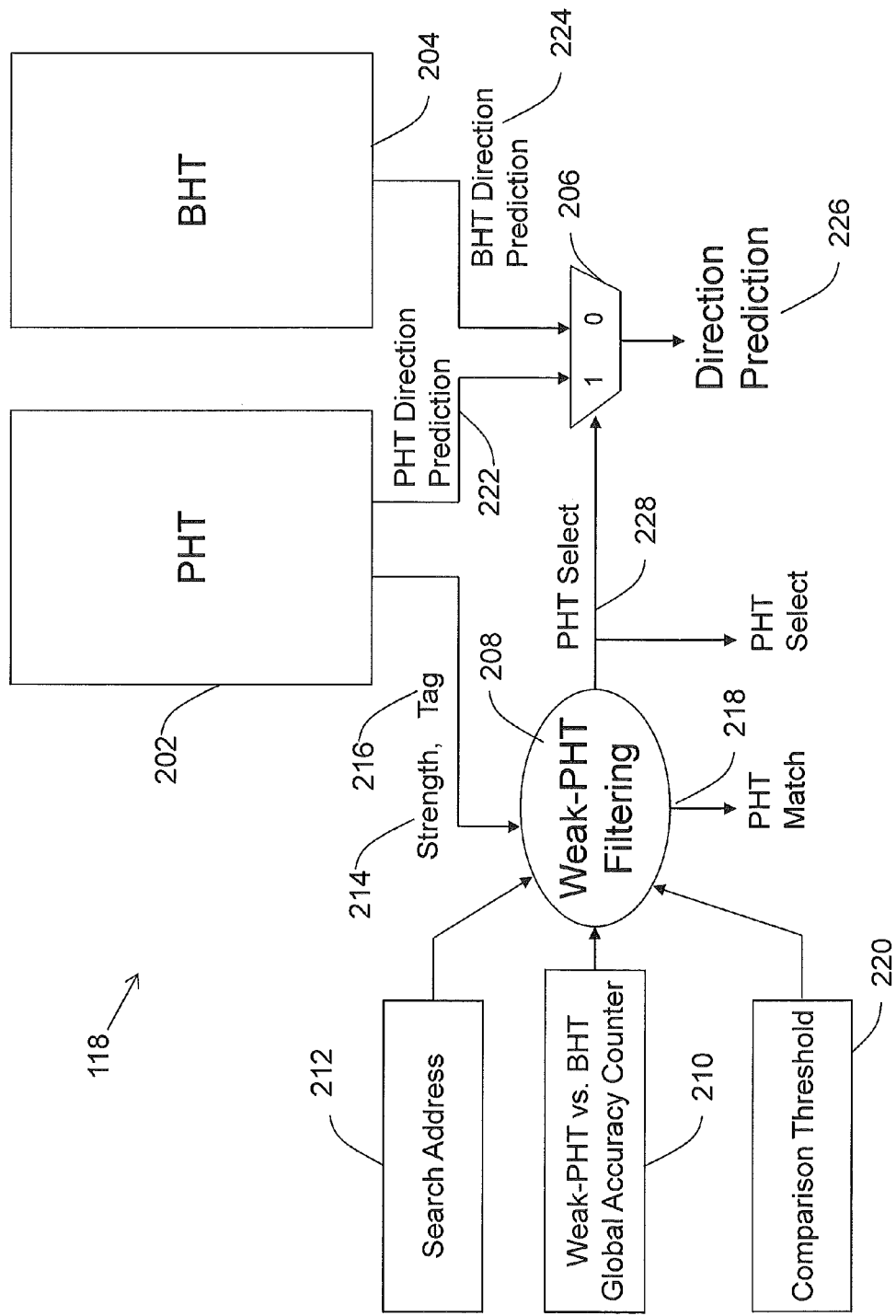
FIG. 2 depicts a branch predictor according to an embodiment.

FIG. 2 depicts an example of the branch predictor 118 of FIG. 1 in greater detail. The example branch predictor 118 of FIG. 2 includes a pattern history table (PHT) 202, a branch history table (BHT) 204, a multiplexer 206, weak-PHT filtering logic 208, and weak-PHT vs. BHT global accuracy counter 210, also referred to as accuracy counter 210. The PHT 202 holds prediction strength indicators for PHT direction predictions and tags associated with branch prediction patterns. A depth (number of entries) of the PHT 202 may be adjusted based on observed recurring branch patterns or sequences observed in instructions processed by the processing system 100 of FIG. 1. The BHT 204 holds branch history information that indicates whether a branch is predicted as taken or not taken. The BHT 204 can also include prediction strength indicators for BHT direction predictions. For example, using a 2-bit field for a prediction strength indicator in combination with a direction prediction provides a range of predictions that can be made for the PHT 202 and the BHT 204, such as: strong not taken, weak not taken, weak taken, and strong taken. When a branch instruction is taken, the strength of prediction can be increased up towards strong taken. When a branch instruction is not taken, the strength of prediction can be decreased incrementally down towards strong not taken. Using both the PHT 202 and the BHT 204 to predict whether a branch will be taken or not taken can further improve prediction accuracy. The PHT 202 and BHT 204 can include other fields and may be combined into other structures. For example, the BHT 204 can be integrated into a BTB. The BHT 204 may be indexed based on an instruction address.

Figure 3:
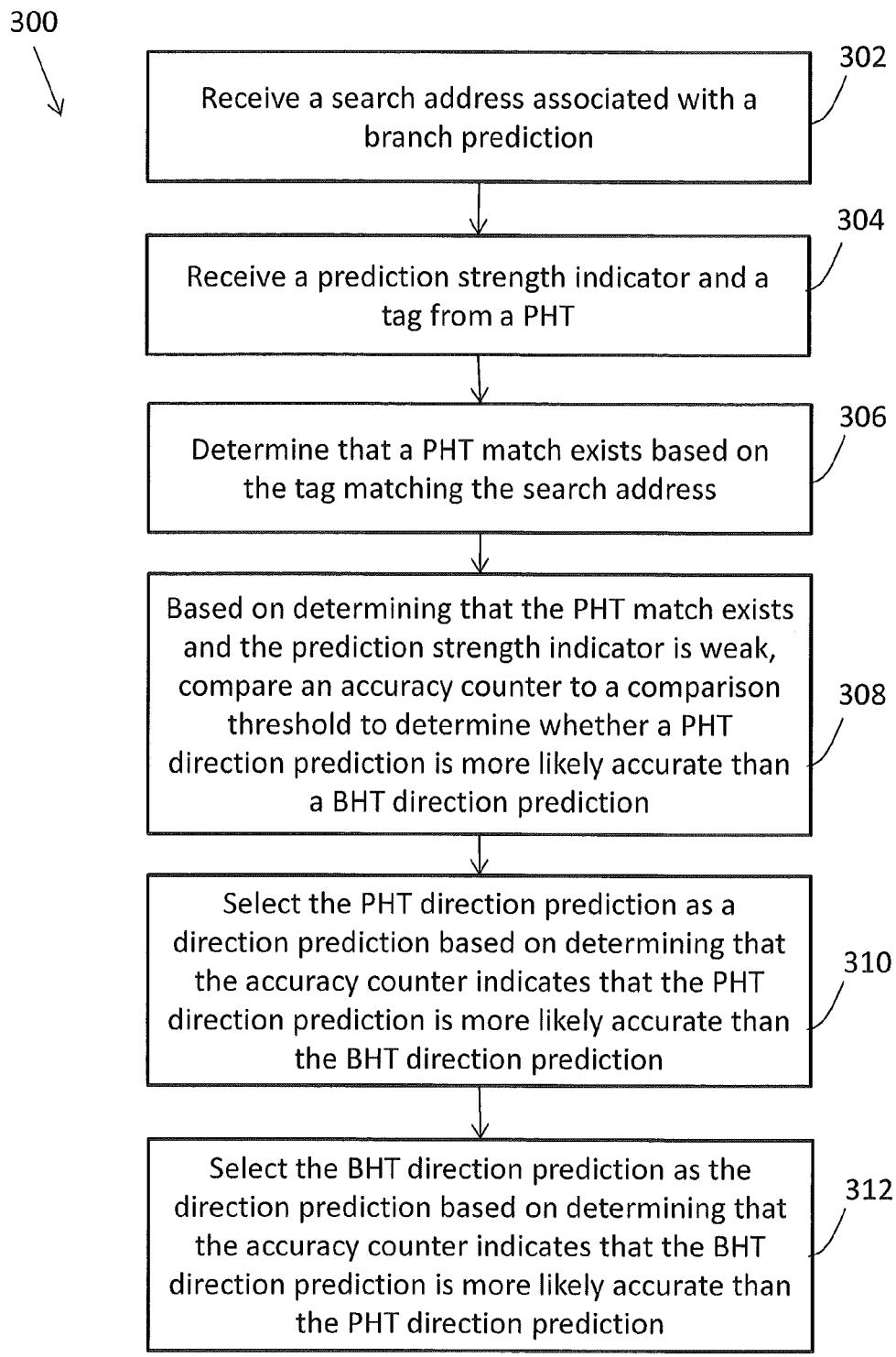
FIG. 3 is a flowchart illustrating a process for pattern history table filtering according to an embodiment.

A process 300 for global weak pattern history table filtering is depicted in FIG. 3 and described with further reference to FIGS. 1 and 2. At block 302, a search address 212 associated with a branch prediction is received at the weak-PHT filtering logic 208. At block 304, the weak-PHT filtering logic 208 receives a prediction strength indicator 214 and a tag 216 from the PHT 202. The PHT 202 may be accessed based on an index that is separately managed and adjusted. Indexing of the PHT 202 can be based on path history and a function of an instruction address, a global direction history vector, and/or a global taken path history vector. At block 306, the weak-PHT filtering logic 208 compared the tag 214 to the search address 212 to determine if a PHT match 218 exists. The tag 216 may include some number of branch instruction address bits.

At block 308, based on determining that the PHT match 218 exists and the prediction strength indicator 214 is weak, the accuracy counter 210 is compared to a comparison threshold 220 to determine whether a PHT direction prediction 222 from the PHT 202 is more likely accurate than a BHT direction prediction 224 from the BHT 204. The accuracy counter 210 may be a 4-bit counter having 16 states, where lower values can indicate that the PHT 202 is more likely accurate than the BHT 204, and higher values indicate that the BHT 204 is more likely accurate than the PHT 202. Accordingly, the comparison threshold 220 can be initialized to a value equal to about half of the range of the accuracy counter 210, for instance to a value of 7. The accuracy counter may be implemented with a greater or fewer number of bits and states.

At block 310, the weak-PHT filtering logic 208 selects the PHT direction prediction 222 as a direction prediction 226 based on determining that the accuracy counter 210 indicates that the PHT direction prediction 222 is more likely accurate than the BHT direction prediction 224. The weak-PHT filtering logic 208 can output a PHT select 228 to the multiplexer 206 for controlling whether the PHT direction prediction 222 or the BHT direction prediction 224 is the direction prediction 226. The direction prediction 226 can be passed to other branch prediction logic or parts of the processing system 100 of FIG. 1, such as the IFU 108 to determine an address for prefetching from the instruction cache 104.

At block 312, the weak-PHT filtering logic 208 selects the BHT direction prediction 224 as the direction prediction 226 based on determining that the accuracy counter 210 indicates that the BHT direction prediction 224 is more likely accurate than the PHT direction prediction 222. Other selection outcomes of the weak-PHT filtering logic 208 may include: selecting the BHT direction prediction 224 as the direction prediction 226 based on determining that the PHT match 218 does not exist, and selecting the PHT direction prediction 222 as the direction prediction 226 based on determining that the PHT match 218 exists and the prediction strength indicator 214 is strong.

Figure 4:
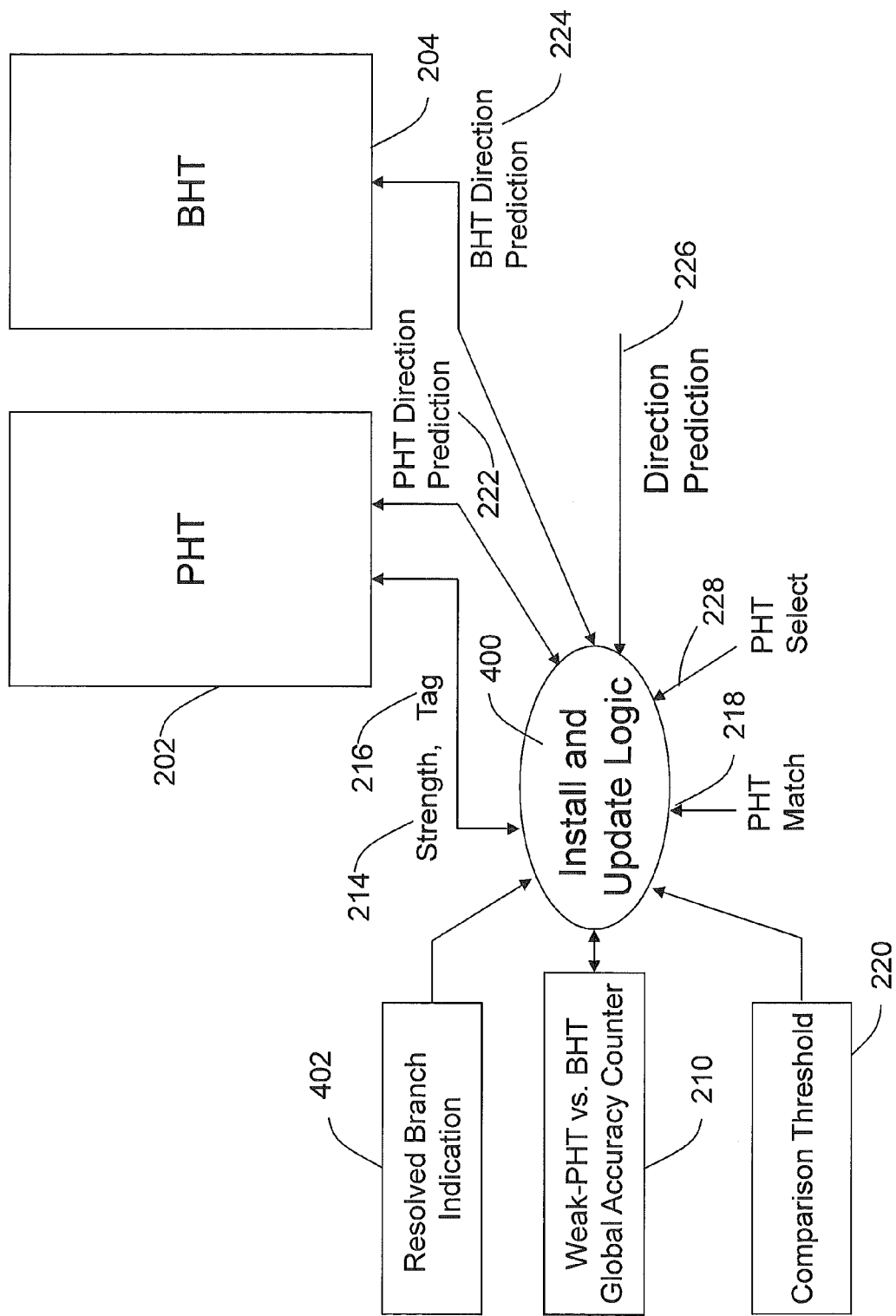
FIG. 4 depicts install and update logic according to an embodiment.
Figure 5:
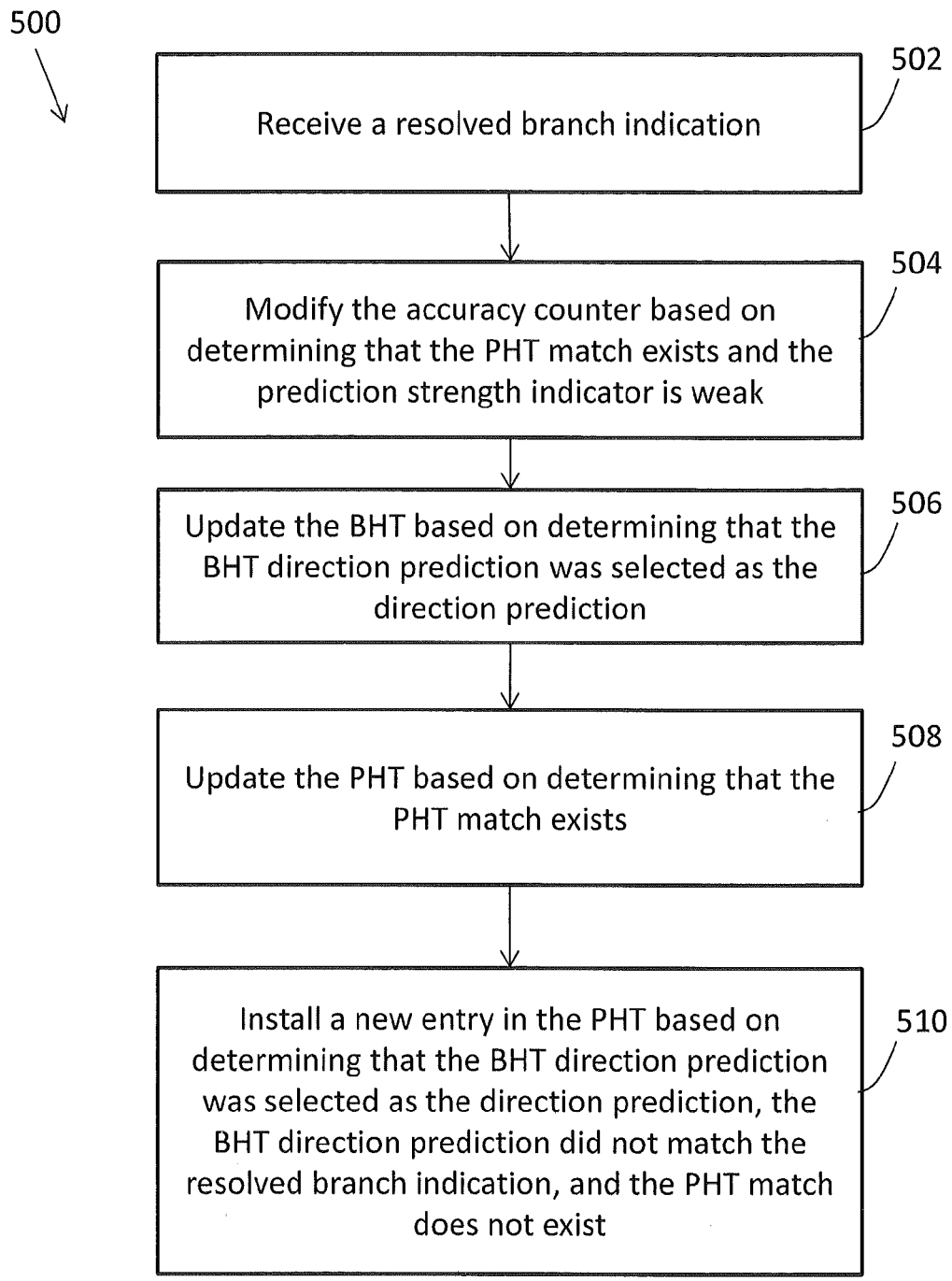
FIG. 5 is a flowchart illustrating a process for branch predictor installing and updating according to an embodiment.

FIG. 4 depicts install and update logic 400 with respect to other branch prediction elements according to an exemplary embodiment. The install and update logic 400 can control when and how various branch prediction elements are updated or new values are installed according to a process 500 for branch predictor installing and updating as depicted in FIG. 5. The process 500 is described in reference to FIGS. 1-4 and can be implemented by the install and update logic 400 of FIG. 4. The install and update logic 400 may be implemented anywhere in the pipeline after the prediction is made until the branch instruction is completed. It can be based on speculative branch resolution information or completely non-speculative branch resolution information at completion time. The prediction state coming from the PHT and BTB going into the install and update logic 400 may therefore be staged for many cycles before being used by the install and update logic 400.

At block 502, the install and update logic 400 receives a resolved branch indication 402. The resolved branch indication 402 may be an indication of whether a predicted branch was taken or not taken after the associated predicted branch is resolved. The resolved branch indication 402 can be determined at a later stage in the processing pipeline 106 of FIG. 1, such as during decode time at decode unit 110, during issue time at issue unit 112, during execution time at execution stage 114, or during write-back time at write-back logic 116.

At block 504, based on determining that the PHT match 218 exists and the prediction strength indicator 214 is weak, the accuracy counter 210 is modified. The accuracy counter 210 is modified in a direction towards indicating that the PHT direction prediction 222 is more likely accurate than the BHT direction prediction 224 based on the PHT direction prediction 222 matching the resolved branch indication 402 and the BHT direction prediction 224 not matching the resolved branch indication 402. The accuracy counter 210 is modified in an opposite direction towards indicating that the BHT direction prediction 224 is more likely accurate than the PHT direction prediction 222 based on the BHT direction prediction 224 matching the resolved branch indication 402 and the PHT direction prediction 222 not matching the resolved branch indication 402. Modifying the accuracy counter 210 in a particular direction can be performed by incrementing or decrementing the accuracy counter 210 until a minimum or maximum value is reached. If the PHT direction prediction 222 and the BHT direction prediction 224 are the same, then the accuracy counter 210 can be left unchanged. The accuracy counter 210 may be initialized to a midpoint value at or near the comparison threshold 220.

At block 506, the install and update logic 400 updates the BHT 204 based on determining that the BHT direction prediction 224 was selected as the direction prediction 226, which can be determined by PHT select 228. Updates to the BHT 204 can include adjusting the BHT direction prediction 224 and/or an associated prediction strength indicator when implemented in the BHT 204.

At block 508, the install and update logic 400 updates the PHT 202 to adjust the prediction strength indicator 214 and/or PHT direction prediction 222 based on determining that the PHT match 218 exists. The prediction strength indicator 214 may be increased to strong when the PHT direction prediction 222 matches the resolved branch indication 402 even if the PHT direction prediction 222 was not selected.

At block 510, the install and update logic 400 installs a new entry in the PHT 202 based on determining that the BHT direction prediction 224 was selected as the direction prediction 226, the BHT direction prediction 224 did not match the resolved branch indication 402, and the PHT match 218 does not exist. The install and update logic 400 may also control other updates or installs as part of the branch predictor 118, such as updating/installing tags 216.

Figure 6:
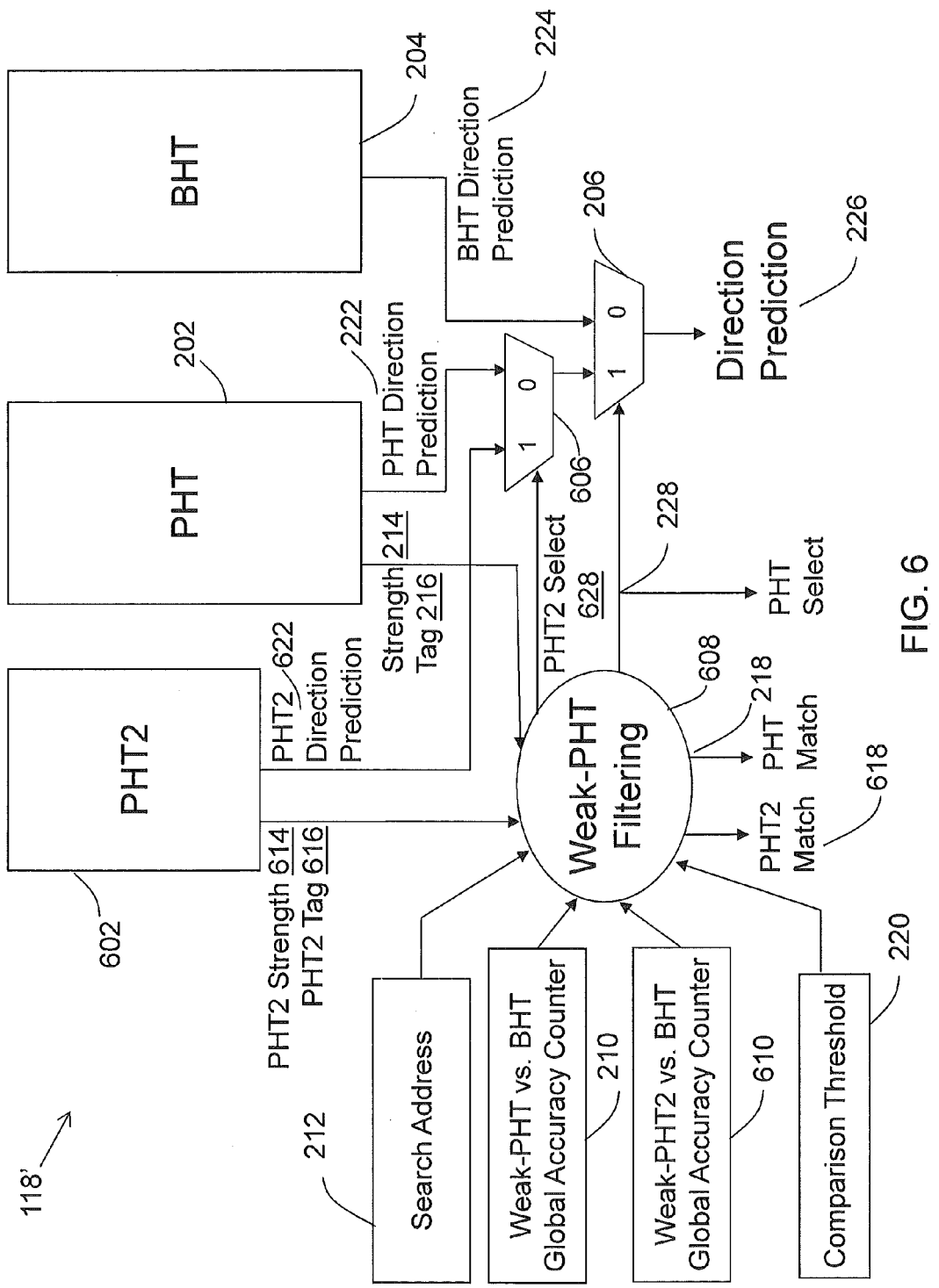
FIG. 6 depicts a further example of a branch predictor according to an embodiment.

FIG. 6 depicts a further example of a branch predictor 118' according to an embodiment. The branch predictor 118' is an alternate embodiment of the branch predictor 118 of FIG. 2, where like elements have the same numbering between FIGS. 2 and 6. The branch predictor 118' includes a second PHT 602 and a second accuracy counter 610. In the example of FIG. 6, a PHT multiplexer 606 receives PHT direction prediction 222 from PHT 202 and a second PHT direction prediction 622 from second PHT 602. Weak-PHT filtering logic 608, as an extension of weak-PHT filtering logic 208 of FIG. 2, may send a PHT select 628 to the PHT multiplexer 606 to select a PHT direction prediction for multiplexer 206. The weak-PHT filtering logic 608 may be further configured to receive a second prediction strength indicator 614 and a second tag 616 from the second PHT 602. The weak-PHT filtering logic 608 can determine that a second PHT match 618 exists based on the second tag 616 matching the search address 212. Based on determining that the second PHT match 618 exists and the second prediction strength indicator 614 is weak, the weak-PHT filtering logic 608 can compare the second accuracy counter 610 to the comparison threshold 220 to determine whether the second PHT direction prediction 622 is more likely accurate than the BHT direction prediction 224. The weak-PHT filtering logic 608 may select one of: the PHT direction prediction 222 and the second PHT direction prediction 622 as the direction prediction 226. Selection of the PHT direction prediction 222 vs. the second PHT direction prediction 622 can be based on a variety of factors, such as relative lengths of the history being used to generate the index into the PHT 202 vs. the second PHT 602 or the relative strength of the accuracy counter 210 vs. the second accuracy counter 610. In other embodiments, the weak-PHT filtering logic 608 can be further partitioned into separate blocks and additional PHTs can be incorporated. The install and update logic 400 of FIG. 4 can be extended to handle updates and installs for the branch predictor 118'.

While the example of branch predictor 118' of FIG. 6 includes two PHTs, further embodiments may include any number of PHTs such that global weak-PHT filtering can be implemented using two or more PHTs in a branch predictor. When using two or more PHTs, various algorithms can be used to select a PHT for a final comparison against the BHT 204. For example, if one PHT indicates a strong prediction strength, that PHT can be selected. If all PHTs have weak prediction strength, the PHT having the greatest length may be selected. Alternatively, an "unfiltered" PHT match with the longest history length can be selected. Each can be PHT checked to determine whether or not its weak-PHT vs. BHT filtering would select it or the BHT, and if the BHT would be selected, then that PHT is not selected. As a further alternative, accuracy counters can be compared for each PHT, with the PHT having an accuracy counter indicating the greatest likelihood of PHT accuracy being selected.

Figure 7:
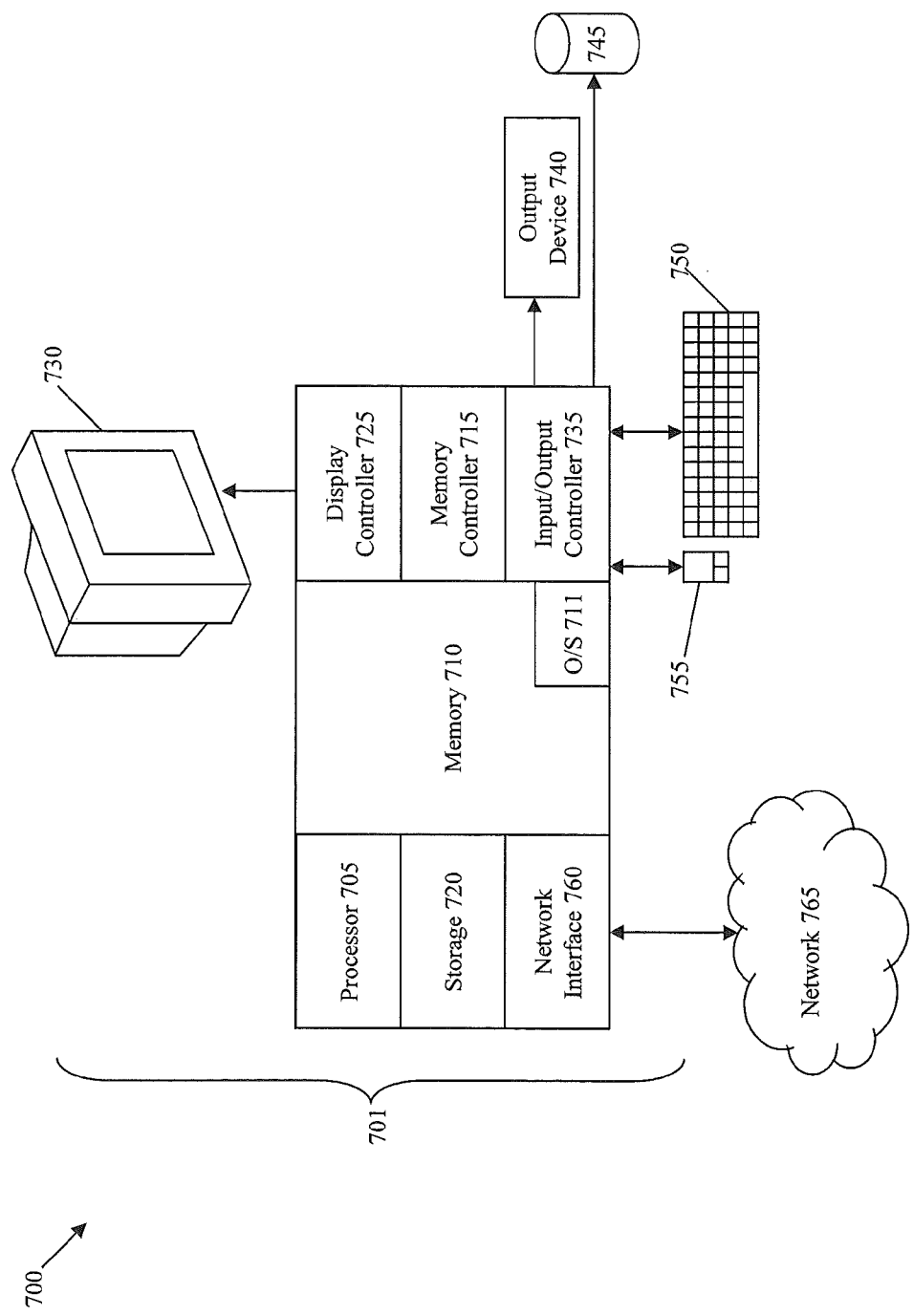
FIG. 7 depicts a computing system according to an embodiment.

FIG. 7 depicts a block diagram of a system 700 for pattern history table filtering in a processor 705. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 700 therefore includes general-purpose computer 701 as illustrated in FIG. 7.

In an exemplary embodiment, in terms of hardware architecture, as shown in FIG. 7, the computer 701 includes a processor 705 which is a processing circuit that includes the processing pipeline 106 of FIG. 1 and a branch predictor 118. The computer 701 further includes memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to fetch and execute instructions stored within the memory 710, to communicate data to and from the memory 710, and to generally control operations of the computer 701 pursuant to the instructions.

In an exemplary embodiment, where the branch predictor 118 of FIG. 2 and/or the branch predictor 118' of FIG. 6 is implemented in hardware, the methods described herein, such as processes 300 and 500 of FIGS. 3 and 5, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
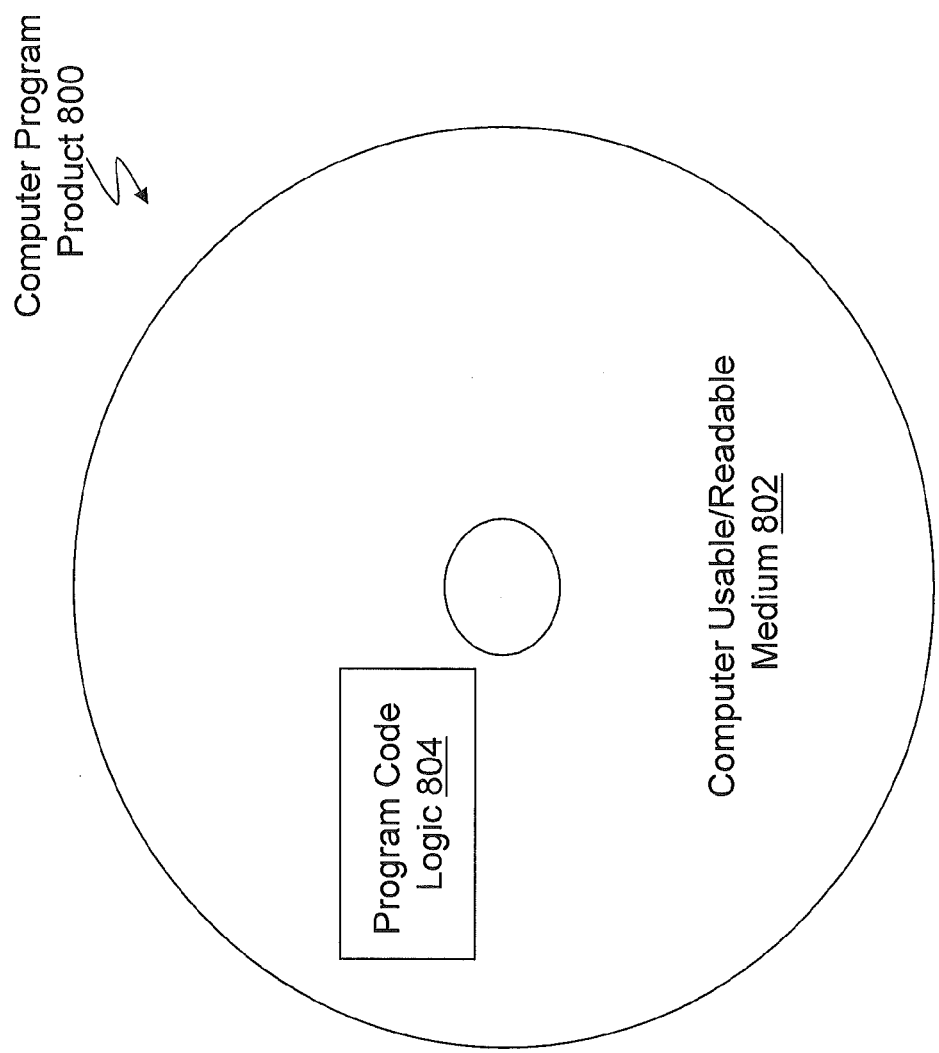
FIG. 8 depicts a computer-readable medium according to an embodiment.

As described above, embodiments can be embodied in the form of computer-implemented processes and apparatuses for practicing those processes. An embodiment may include a computer program product 800 as depicted in FIG. 8 on a computer readable/usable medium 802 with computer program code logic 804 containing instructions embodied in tangible media as an article of manufacture. Exemplary articles of manufacture for computer readable/usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects and benefits include pattern history table filtering which can improve branch prediction accuracy. Embodiments attempt to predict whether a weak prediction from one or more PHTs is more likely accurate than a weak prediction from a BHT, and the source that is deemed more likely accurate is selected.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for pattern history table filtering, the system comprising:
   a pattern history table;
   a branch history table;
   an accuracy counter; and
   a processing circuit configured to perform a method comprising:
      receiving a search address associated with a branch prediction;
      receiving a prediction strength indicator and a tag from the pattern history table, the prediction strength indicator having a value of weak or strong defined relative to a pattern history table direction prediction of a corresponding branch as taken or not taken wherein the prediction strength indicator transitions between weak and strong based on receiving a resolved branch indication of taken or not taken such that a combination of the prediction strength indicator and the pattern history table direction prediction supports transitions between a range of predictions comprising: strong not taken, weak not taken, weak taken, and strong taken;
      determining whether a pattern history table match exists based on the tag matching the search address;
      based on determining that the pattern history table match exists and the prediction strength indicator is weak, comparing the accuracy counter to a comparison threshold to determine whether a pattern history table direction prediction from the pattern history table is more likely accurate than the branch history table direction prediction from the branch history table;
      selecting the pattern history table direction prediction as a direction prediction based on determining that the accuracy counter indicates that the pattern history table direction prediction is more likely accurate than the branch history table direction prediction, the pattern history table match exists, and the prediction strength indicator is weak;
      selecting the branch history table direction prediction as the direction prediction based on determining that the accuracy counter indicates that the branch history table direction prediction is more likely accurate than the pattern history table direction prediction, the pattern history table match exists, and the prediction strength indicator is weak;
      selecting, by the processing circuit, the pattern history table direction prediction as the direction prediction based on determining that the pattern history table match exists and the prediction strength indicator is strong; and
      selecting, by the processing circuit, the branch history table direction prediction as the direction prediction based on determining that the pattern history table match does not exist.

2. The system of claim 1, wherein the processing circuit is further configured to perform:
   receiving the resolved branch indication; and
   based on determining that the pattern history table match exists and the prediction strength indicator is weak:
      modifying the accuracy counter in a direction towards indicating that the pattern history table direction prediction is more likely accurate than the branch history table direction prediction based on the pattern history table direction prediction matching the resolved branch indication and the branch history table direction prediction not matching the resolved branch indication; and
      modifying the accuracy counter in an opposite direction towards indicating that the branch history table direction prediction is more likely accurate than the pattern history table direction prediction based on the branch history table direction prediction matching the resolved branch indication and the pattern history table direction prediction not matching the resolved branch indication.

3. The system of claim 1, wherein the processing circuit is further configured to perform:
   updating the branch history table based on determining that the branch history table direction prediction was selected as the direction prediction; and
   updating the pattern history table based on determining that the pattern history table match exists to adjust the prediction strength indicator.

4. The system of claim 1, further comprising:
   a second pattern history table;
   a second accuracy counter; and
   the processing circuit is further configured to perform:
      receiving a second prediction strength indicator and a second tag from the second pattern history table;
      determining that a second pattern history table match exists based on the second tag matching the search address;
      based on determining that the second pattern history table match exists and the second prediction strength indicator is weak, comparing the second accuracy counter to the comparison threshold to determine whether a second pattern history table direction prediction is more likely accurate than the branch history table direction prediction; and
      selecting one of: the pattern history table direction prediction and the second pattern history table direction prediction as the direction prediction.

5. The system of claim 1, wherein the processing circuit is further configured to perform:
   installing a new entry in the pattern history table based on determining that the branch history table direction prediction was selected as the direction prediction, the branch history table direction prediction did not match the resolved branch indication, and the pattern history table match does not exist.

* * * * *